United States Patent Office 3,039,445
Patented June 19, 1962

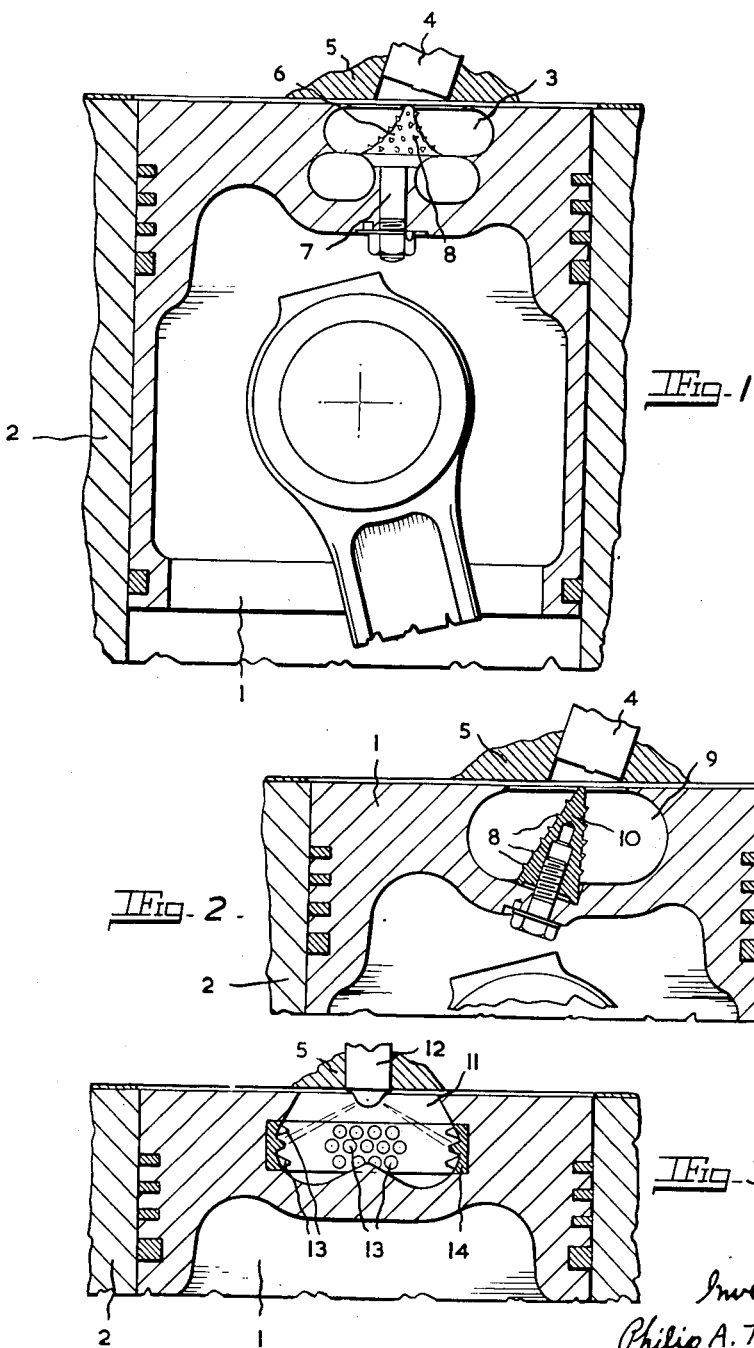

3,039,445
INTERNAL COMBUSTION ENGINES OF THE LIQUID FUEL INJECTION COMPRESSION IGNITION TYPE
Philip Aubrey Thornton Crowther, Knowle, and John Swaine, Coventry, England, assignors to The Rover Company Limited, Meteor Works, England, a British company
Filed July 13, 1959, Ser. No. 826,819
Claims priority, application Great Britain July 16, 1958
5 Claims. (Cl. 123—32)

This invention relates to internal combustion engines of the liquid fuel injection compression ignition type of the kind in which the greater proportion of the air charge is forced during each compression stroke into one or more combustion chambers formed between the piston face and the cylinder head and so as to be in open communication with the cylinder bore, the chamber or each chamber being approximately a figure of revolution about an axis and the arrangement being such that the air charge in the chamber or each chamber is caused to be in a state of organised rotation within the chamber or chambers at the end of the compression stroke. The chamber or each chamber may be formed substantially wholly by a depression or recess in the piston, substantially wholly by a depression or recess in the cylinder head or jointly by depressions in both cylinder head and piston and will normally be of substantially smaller diameter than the diameter of the cylinder bore.

It is an object of the invention to provide an improved construction of internal combustion engine of the above kind which will tend to run smoothly and quietly over its normal speed and power range, in which maximum cylinder pressure and rate of pressure rise may be reduced without materially affecting power output as compared with engines of the kind in question at present in use, and in which smoke in the exhaust gases due to imperfect combustion will be reduced.

In an internal combustion engine of the liquid fuel injection compression ignition type and of the kind referred to, according to the present invention, there are formed or provided on at least a part of the surface of the chamber or each chamber over which circumferential portions of the air charge sweep, by reason of the organised rotation of such air charge in the chamber, a series of closely spaced projections or depressions such as to disturb to a subtantial degree the smooth flow of the circumferential portions of the rotating air charge which sweep over and/or between them.

The invention may be applied for example to an engine of the kind referred to having a single combustion pocket with its axis situated at or adjacent to the axis of the cylinder and wherein the rotation of the air charge in the pocket is caused at least partially by so called "induction swirl," that is to say, by arranging for the admission of air to the cylinder during the induction stroke or scavenging period in such a direction as to cause bodily rotation of the air charge about the cylinder axis, which rotation persists during the compression stroke and thus produces a corresponding rotation of the air in the pocket at the end of the compression stroke, whether or not such rotation is augmented by so called "squish," that is to say the formation of parts of the piston and cylinder head which approach one another closely at the end of the compression stroke in such manner as to cause air forced into the pocket by such close approach to follow one or more predetermined paths, such as to augment the air rotation in the pocket. The invention is however also applicable to engines provided with one or more pockets in which the bodily rotation of the air charge is caused substantially wholly by "squish."

The disposition of the fuel injection device or devices employed in engines according to the invention and the direction of the jet or jets of fuel delivered thereby in relation to the circumferential wall of the pocket or each pocket, may vary but in one arrangement a fuel injection device or each of two or more such devices may be situated and arranged so as to deliver fuel towards a part of the circumferential surface of the pocket or each pocket which, considered in relation to the direction of circumferential movement of the air charge, lies a little in advance of a part of such circumferential surface on which the closely spaced projections or depressions are formed or provided or towards the closely spaced projections themselves.

The form of the projections or depressions vary widely. They may for example be projections of conical or thimble-like form with each projection spaced from its neighbour by depressed areas of the surface and may then extend either wholly or partially at right angles to or parallel to or in a direction inclined to the general direction of flow of the circumferential portions of the air charge over and between them.

It will be appreciated that projections and depressions have a similar effect in disturbing the air flow and indeed, if projections are spaced so closely together that they overlap, they become virtually indistinguishable from closely spaced depressions.

The invention will now be described by way of example with reference to the accompanying drawings, in which:

FIGURE 1 is a vertical section through a piston and cylinder of a direct-injection compression ignition engine, in which the combustion chamber is substantially wholly within the crown of the piston;

FIGURE 2 is a view similar to FIGURE 1, showing a different form of combustion chamber; and FIGURE 3 is a similar view showing a third form of combustion chamber.

Referring first to FIGURE 1, a piston 1, reciprocating vertically in a cylinder 2, has formed in its crown a combustion chamber 3 in the shape of two superimposed toroids, and liquid fuel is injected directly into this chamber from an injector 4, disposed in the cylinder head 5 and inclined at a small angle to the cylinder axis. The inlet and exhaust valves are not shown. This general shape of open combustion chamber is designed to ensure thorough mixing of the injected fuel with the air charge, which has been in rotation in the form of toroidal eddies by the action of "squish" in the final part of the compression stroke of the piston 1.

In this chamber embodying the invention, there is an insert 6 which is disposed substantially in the upper part of the chamber 3 and secured by a stud 7 passing up through the underside of the piston crown. The insert 6 is of heat resisting material and is of a modified conical shape with its axis substantially coincident with that of the injector 4. Its curved surface is covered with a series of small conical projections 8, one effect of which is to break up the smooth flow of those peripheral portions of the rotation air charge which are closely adjacent to the surface of the insert 6. In this way the intimate mixing of the injected fuel charge with the air charge in this region is ensured and the process of combustion improved.

A more important effect of these projections however, is the rapid transfer of heat to the fuel and air mixture from the insert 6, which is hot as it has a limited heat-conducting path with the remainder of the walls of the chamber. The presence of the projections 8 increases the area of the surface of the insert 6, as compared with a smooth surface of the same overall dimensions, and the transfer of heat to the charge is accordingly more rapid.

In the double toroidal chamber shown in FIGURE 1, the air charge has a toroidal rotation in the upper toroid as a result of "squish" by the piston, and then, on combustion, the charge rotates also in the lower toroid.

The arrangement shown in FIGURE 2 is similar to that of FIGURE 1 and like parts have been numbered the same, but here the chamber, shown at 9, is of simpler shape, and the insert 10 is of conical shape with a smaller cone angle. The projections 8 are similar to those of FIGURE 1. The turbulence may be achieved solely by "squish" or it may be assisted by masking of the inlet valve.

FIGURE 3 shows a combustion chamber 11 of the Saurer type, again wholly in the piston crown and provided with an injector 12 which has its axis parallel to that of the cylinder and has four jets directing the fuel charge towards the side walls of the chamber 11, as indicated in broken lines. Over those regions of the wall towards which the fuel is directed there are provided projections 13. These are arranged in four groups, spaced around the inner face of a cylindrical insert 14. It will be understood that if there had been five or six or any other number of jets in the injector there would be a corresponding number of groups of projections.

The number and size of the projections is not critical in any of the examples and, as indicated earlier, conical or other similar depressions would achieve the same result. It has been found that for best results the height of each projection or depth of each depression should not be less than 0.009 of an inch and they should be of such a form as to increase the area of wall or insert surface over which they extend by at least 10% as compared with a smooth surface of the same overall dimensions. The projections or depressions may be provided on an integral portion of the wall of the combustion chamber or, as indicated in the examples, on a separate insert, and the insert could be of a kind which has limited heat-conducting contact with the body of the piston or cylinder-head in which it is mounted.

There may be projections on the side walls in addition to a cone covered with projections, i.e. the arrangements of FIGURES 2 and 3 may be combined. In all the arrangements shown the projections are formed on an insert which is bolted to or cast into the piston, but in fact the entire combustion chamber may be formed in an insert, for example by the "lost wax" process, and this insert is cast into the piston. In this case the projections (or depressions) would be integral with the remainder of the combustion chamber wall.

We claim:

1. In an internal combustion engine of the compression ignition type having a fuel injection device and of the kind in which the greater proportion of an air charge is forced during each compression stroke into a combustion chamber formed by a recess in the crown of a piston and so as to be in open communication with the cylinder bore, the chamber being approximately a figure of revolution about an axis and the arrangement being such that the air charge in the chamber is caused to be in a state of organized rotation within the chamber at the end of each compression stroke, a member projecting from the wall of said chamber opposite the fuel injection device and terminating within said chamber, i.e. short of said cylinder bore, the surface of said projecting member being covered with a series of rows of closely spaced projections such as to force a region of roughened contour that will disturb to a substantial degree the smooth flow of the air charge which sweeps over them.

2. The apparatus recited in claim 1, wherein said projections have a height of at least 0.009 of an inch.

3. The apparatus recited in claim 1, wherein said projections are of such a form as to increase the area of the surface of said member over which they extend by at least 10% as compared with a smooth surface of the same overall dimensions.

4. In an internal combustion engine of the compression ignition type having a liquid fuel injection device and of the kind in which the greater proportion of an air charge is forced during each compression stroke into a combustion chamber formed between a piston face and cylinder head and so as to be in open communication with the cylinder bore, the chamber being approximately a figure of revolution about an axis and the arrangement being such that the air charge in the chamber is caused to be in a state of organized rotation within the chamber at the end of each compression stroke, an insert of generally conical shape secured by its base to the wall of said chamber opposite the fuel injection device and extended towards said device, the curved surface of said insert being provided with a series of closely spaced irregularities such as to disturb to a substantial degree the smooth flow of the air charge which sweeps over them.

5. The apparatus recited in claim 4, wherein said chamber is of double toroidal form comprising upper and lower toroids, and said member projects from said lower toroid into the central region of said upper toroid.

References Cited in the file of this patent

UNITED STATES PATENTS

| | | |
|---|---|---|
| 2,511,992 | Quick | June 20, 1950 |
| 2,709,992 | Graves | June 7, 1955 |
| 2,762,348 | Meurer | Sept. 11, 1956 |
| 2,832,325 | Liebel | Apr. 29, 1958 |
| 2,855,906 | Galli | Oct. 14, 1958 |
| 2,873,727 | Meurer | Feb. 17, 1959 |

FOREIGN PATENTS

| | | |
|---|---|---|
| 488,756 | Italy | Jan. 8, 1954 |
| 489,496 | Italy | Jan. 22, 1954 |
| 1,140,705 | France | Aug. 12, 1957 |